Patented June 15, 1926.

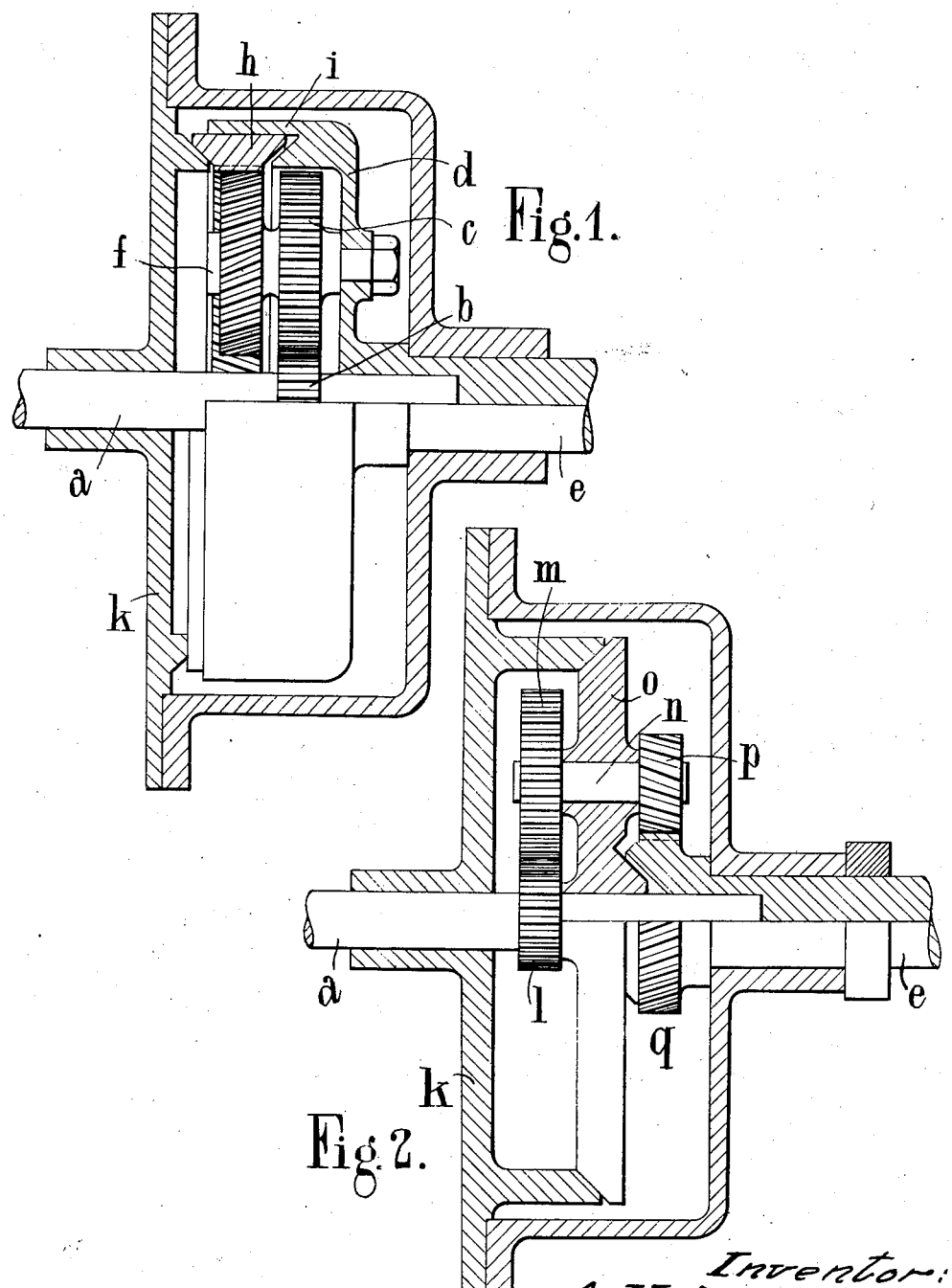

1,588,602

UNITED STATES PATENT OFFICE.

ALBERT HENRY MIDGLEY, OF UXBRIDGE, ENGLAND, ASSIGNOR TO MIDGLEY CAR LIGHTING COMPANY, LIMITED, OF LONDON, ENGLAND.

POWER-TRANSMISSION MECHANISM.

Application filed October 24, 1922, Serial No. 596,660, and in Great Britain December 2, 1921.

This invention relates to power transmission mechanism and, while it is particularly designed for use with the electric starting mechanism of motor vehicles to obviate the flywheel and free-wheel arrangements usually adopted in connection therewith yet it is at the same time applicable with equal effect and like advanage in all cases where a gear is required capable of giving an increase or decrease of speed for one direction of power transmission and a direct drive for the other direction.

The invention consists in power transmission mechanism which automatically adjusts itself to select the appropriate speed of drive according to the direction in which the power is transmitted.

The invention also consists in power transmission mechanism having a clutch member which is automatically moved by a part of the gear depending upon the direction of transmission so that the proper speed is selected for such direction.

The invention also consists in other details and arrangements hereinafter described or indicated.

The accompanying drawings illustrate two modes of carrying out the invention.

Figure 1 is a sectional elevation of one form of apparatus in accordance with the invention.

Figure 2 is a similar view showing a modification.

In carrying my invention into effect in one convenient manner as illustrated, for example, in Figure 1 in its application to electric starting mechanism for motor vehicles in which the starting motor is required to drive the engine at a reduced speed but is itself required to be driven at engine speed when running as a dynamo, I provide on the motor shaft or spindle $a$ a sun wheel $b$ which is adapted to gear with a planet wheel $c$ carried by a plate or other member $d$ formed on or supported by or rotatable with the engine shaft $e$. The planet wheel is mounted on a spindle $f$ which carries on its inner end a helical toothed pinion $g$ which is adapted to gear with an annulus or ring $h$ having a bearing on the inside or outside of a flange $i$ on the plate or member carrying the planet wheel and the annulus or ring is provided as shown with two conical or other friction surfaces or other means, such that endwise movement of the annulus in one direction will clutch the same to the plate $d$ carrying the planet wheel, while endwise movement in the other direction clutches the annulus to a fixed plate or casing $k$ which encloses the whole of the gear or forms a cover for the gear casing so as to form an oil bath in which such gear may work.

The helical gear is so arranged that when power is to be transmitted from the motor to the engine the annulus moves in such a direction that it is clutched to the stationary casing, whereupon the drive is transmitted from the motor to the engine through the gearing at a reduced speed dependent upon the ratio of the gearing employed.

On the other hand, when the drive is from the engine to the motor the annulus is then clutched to the plate so that the drive is direct, and under no circumstances when a gear is so aranged can the speed of the motor armature exceed that of the engine shaft, since when power is transmitted from the engine shaft the gear is direct while under light loads the slip of the friction surface would come into play to prevent the drive being transmitted at any increased speed in proportion to the ratio of the gear.

It will be understood that while I have described my invention as applied in one form to a sun and planet gear, the invention is not to be confined to any such arrangement as it may, for example, be applied to any ordinary arrangement of spur or other gearing for transmitting decreased or increased speeds.

Thus, in one such modification shown in Figure 2, the starting motor shaft $a$ may carry a spur wheel $l$ adapted to gear with a second spur wheel $m$ mounted on a shaft $n$ and carried by a plate or other member $o$ and having at its inner end a helical pinion $p$ engaging the second helical pinion $q$ on the engine shaft $e$. In this form the spindle $n$ may rotate freely in the plate $o$ but may not move endwise in relation thereto and the plate itself would carry two friction surfaces or clutching means, one of which would co-operate with a fixed casing or cover $k$ or other fixed part while the other would co-operate with a friction surface or clutching means on the helical pinion $q$ mounted on the engine shaft.

In a still further modification of the invention, I may provide a suitable gear of somewhat the above character on or in connection with the starter shaft, part of the gear being carried by a plate or carrier having thereon also one part of a friction clutch, the other part of which is carried by the engine shaft, the arrangement being such that when power is applied to the starter shaft the engine shaft is rotated at reduced speed through the clutch while when power is applied to the engine shaft the clutch slips and no power can therefore be applied from engine to starter.

Furthermore, the invention may be applied to starting arrangements, embodying both an electric motor and a dynamo, or it may be applied to a self-contained arrangement in which the one machine acts either as a motor or dynamo, and in any modification the motor may embody starting brushes as described in the specification of my British application No. 21478 of 1921.

Further, the invention is generally applicable as a transmission system in any situation in which a similar arrangement of control is required, and is not therefore to be confined to the applications which have been hereinbefore given by way of illustration only and not of limitation.

Having now described my invention, what I claim as new and desire to secure by Letters Patent is:—

1. A power transmission mechanism connecting a driving and a driven shaft comprising in combination a sun wheel upon one of said shafts, a planet wheel meshing with said sun wheel and connected with the other of said shafts, a spindle separate from said shafts and supporting said planet wheel, a helical pinion carried upon said spindle and a clutch member gearing with said helical pinion and movable axially thereby in one direction or the other according to the direction of the power transmission.

2. A power transmission mechanism including a driving and driven shaft comprising a sun wheel arranged upon one of the shafts, a planet wheel meshing with the sun wheel and connected with the other of said shafts, a spindle separate from said shafts and supporting the planet wheel, a helical pinion carried upon said spindle, an axially movable clutch member, braking means coacting with the clutch member when the latter is moved in one direction, means enabling said clutch member when moved in the opposite direction to establish a driving connection with the second mentioned shaft, and means coacting with the helical pinion to effect axial movement of the clutch member.

In testimony whereof I have signed my name to this specification.

ALBERT HENRY MIDGLEY.